US011873885B2

(12) United States Patent
Labelle

(10) Patent No.: US 11,873,885 B2
(45) Date of Patent: Jan. 16, 2024

(54) BEARING SUPPORT FOR PARALLEL ELECTRIC AXLE GEAR ASSEMBLY

(71) Applicant: Linamar Corporation, Guelph (CA)

(72) Inventor: Chad Labelle, Livonia, MI (US)

(73) Assignee: Linamar Corporation, Guelph (CA)

( * ) Notice: Subject to any disclaimer, the term of this patent is extended or adjusted under 35 U.S.C. 154(b) by 13 days.

(21) Appl. No.: 17/761,237

(22) PCT Filed: Sep. 17, 2019

(86) PCT No.: PCT/US2019/051389
§ 371 (c)(1),
(2) Date: Mar. 17, 2022

(87) PCT Pub. No.: WO2021/054938
PCT Pub. Date: Mar. 25, 2021

(65) Prior Publication Data
US 2022/0381325 A1 Dec. 1, 2022

(51) Int. Cl.
*B60K 1/00* (2006.01)
*F16H 37/08* (2006.01)
(Continued)

(52) U.S. Cl.
CPC ........... *F16H 37/0813* (2013.01); *B60K 1/00* (2013.01); *F16H 57/021* (2013.01); *F16H 57/037* (2013.01); *B60K 2001/001* (2013.01); *F16H 2057/02034* (2013.01); *F16H 2057/02052* (2013.01)

(58) Field of Classification Search
CPC .. F16H 37/0813; F16H 57/021; F16H 57/037; F16H 2057/02034; F16H 2057/02052; B60K 1/00; B60K 2001/001
See application file for complete search history.

(56) References Cited

U.S. PATENT DOCUMENTS

2002/0104704 A1* 8/2002 Chang .................. B60K 1/00
180/242
2006/0166777 A1* 7/2006 Aikawa ................ B60K 6/442
475/149

(Continued)

FOREIGN PATENT DOCUMENTS

| CN | 108327530 A | * 7/2018 | ........... B60K 17/165 |
| JP | 201716100 | 9/2017 | |
| WO | 2010053745 | 5/2010 | |

*Primary Examiner* — Sherry L Estremsky
(74) *Attorney, Agent, or Firm* — Miller Canfield

(57) ABSTRACT

Bearings (72, 74) are arranged for a drive unit (10) having an electric motor for providing drive to an electric axle and a wheel assembly of a vehicle. The drive unit includes a pair of bearings and a reduction gear assembly (12) with a first drive gear mounted to and coaxial with the main shaft of the motor, and a first driven gear rotatably coupled to the first drive gear and mounted to and coaxial with an intermediate shaft to form an intermediate shaft assembly. The reduction gear assembly includes a second drive gear mounted to and coaxial with the intermediate shaft, and a second driven gear rotatably coupled with the second drive gear. A first bearing of said pair of bearings is mounted to a bulkhead and to said intermediate shaft assembly between the first driven gear and second drive gear to reduce the distance between the first and second bearings.

13 Claims, 3 Drawing Sheets

(51) Int. Cl.
*F16H 57/021* (2012.01)
*F16H 57/037* (2012.01)
F16H 57/02 (2012.01)

(56) References Cited

U.S. PATENT DOCUMENTS

2011/0094806 A1 4/2011 Mack et al.
2016/0252171 A1 9/2016 Hederstad
2019/0128316 A1* 5/2019 Pydin .................. F16H 57/0025

* cited by examiner

BEARING SUPPORT FOR PARALLEL ELECTRIC AXLE GEAR ASSEMBLY

FIELD OF THE INVENTION

The present disclosure relates to a gear assembly for an electric axle of a vehicle.

BACKGROUND OF THE INVENTION

A drive unit for an electric axle of a motor vehicle typically includes a reducer gearbox or, more generally, a reduction gear assembly or an arrangement of gears to reduce the speed or rotational movement of a motor. The reduced speed is translated into an increased torque delivered to the wheels of the vehicle. The gear assembly typically is supported by multiple bearings and must fit within a constrained space for the drive unit of the vehicle. The electric axle may be part of an electric motor vehicle or a hybrid electric vehicle (HEY).

SUMMARY OF THE INVENTION

According to one embodiment there is disclosed a drive unit for an electric axle of a vehicle, the drive unit having an electric motor for providing drive to a wheel assembly. The drive unit includes a housing having a bulkhead portion, a main shaft driven by the motor and a reduction gear assembly coupled to the main shaft, the reduction gear assembly having a first stage gear assembly, an intermediate shaft, and a second stage gear assembly. The first stage gear assembly has a first drive gear mounted to and coaxial with the main shaft, and a first driven gear rotatably coupled to the first drive gear and mounted to and coaxial with the intermediate shaft. The second stage gear assembly has a second drive gear mounted to and coaxial with the intermediate shaft, and a second driven gear rotatably coupled with the second drive gear. The first driven gear, second drive gear and intermediate shaft form an intermediate shaft assembly. The intermediate shaft assembly includes a pair of bearings. A first bearing of said pair of bearings is mounted to the bulkhead portion of the housing and to the intermediate shaft assembly between the first driven gear and second drive gear.

In some embodiments, the first bearing is mounted between the bulkhead portion of the housing and the first driven gear. The first driven gear and the second drive gear may also be integral with the intermediate shaft.

In some embodiments, the first driven gear and the first bearing are mounted to a proximal end of the intermediate shaft axially adjacent to the motor, and a second bearing of the pair of bearings is mounted between the housing and a distal end of the intermediate shaft. The bearings may be any of various combinations of fixed, floating or adjusted bearing pairs.

In some embodiments, the first bearing is configured to support axial loads in a direction towards the proximal end of the intermediate shaft and the second bearing is configured to support axial loads in a direction towards the distal end of the intermediate shaft. The intermediate shaft can extend continuously from the first driven gear to the second drive gear and can be parallel to and spaced apart radially from the main shaft.

In some embodiments, the bulkhead portion of the housing is configured to rotatably support through a bearing one end of a differential unit coupled to the second driven gear for transferring drive to the wheel assembly. The rotational speed of the second driven gear may be less than the rotational speed of the first driven gear. The main shaft may be directly or indirectly connected to the motor.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF THE EMBODIMENTS

The present disclosure is directed to a drive unit for an electric axle of a motor vehicle, including battery electric motor vehicles (BEV) and hybrid electric vehicles (HEV). Specifically, the present disclosure is directed to a configuration of bearings for supporting a reduction gear assembly in the drive unit.

Some electric axles or eAxles include a reduction gearbox or gear assembly, which is coupled to the electric motor in order to increase the torque and reduce the speed to be delivered to the wheels of the vehicle. The gearbox is often composed of two helical or spur gear stages arranged in parallel axes. The driven gear of the first stage and the drive gear of the second stage may be attached to an intermediate shaft supported by two bearings. A conventional arrangement is to have the gears adjacent to one another and one bearing supporting each outer end of the intermediate shaft. This arrangement can be axially fixed with a fixed/floating, floating or adjusted bearing arrangement.

According to the embodiments of the present disclosure, the bearing arrangement for the reduction gear assembly is improved by moving the location of the bearing that supports the intermediate shaft near the driven gear of the first stage. Specifically, this bearing is mounted to the bulkhead portion of the housing and to an intermediate shaft assembly placed between the driven gear of the first stage and the drive gear of the second stage. In one embodiment, the bearing is mounted to the housing and to the driven gear of the first stage. The intermediate shaft is thus supported by the housing through the bearing. The second bearing is located at the distal end of the intermediate shaft. By reducing the distance between the first bearing and the second drive gear, the fatigue life of each bearing is more balanced. The loads of the small gear (the drive gear of the second stage) are usually much higher than the loads of the larger gear (the driven gear of the first stage). Reducing the distance between the bearings also may improve the drive unit by enabling a more compact package. The tolerance stack ups and thus noise for the bearings also may be reduced.

Figure 1:
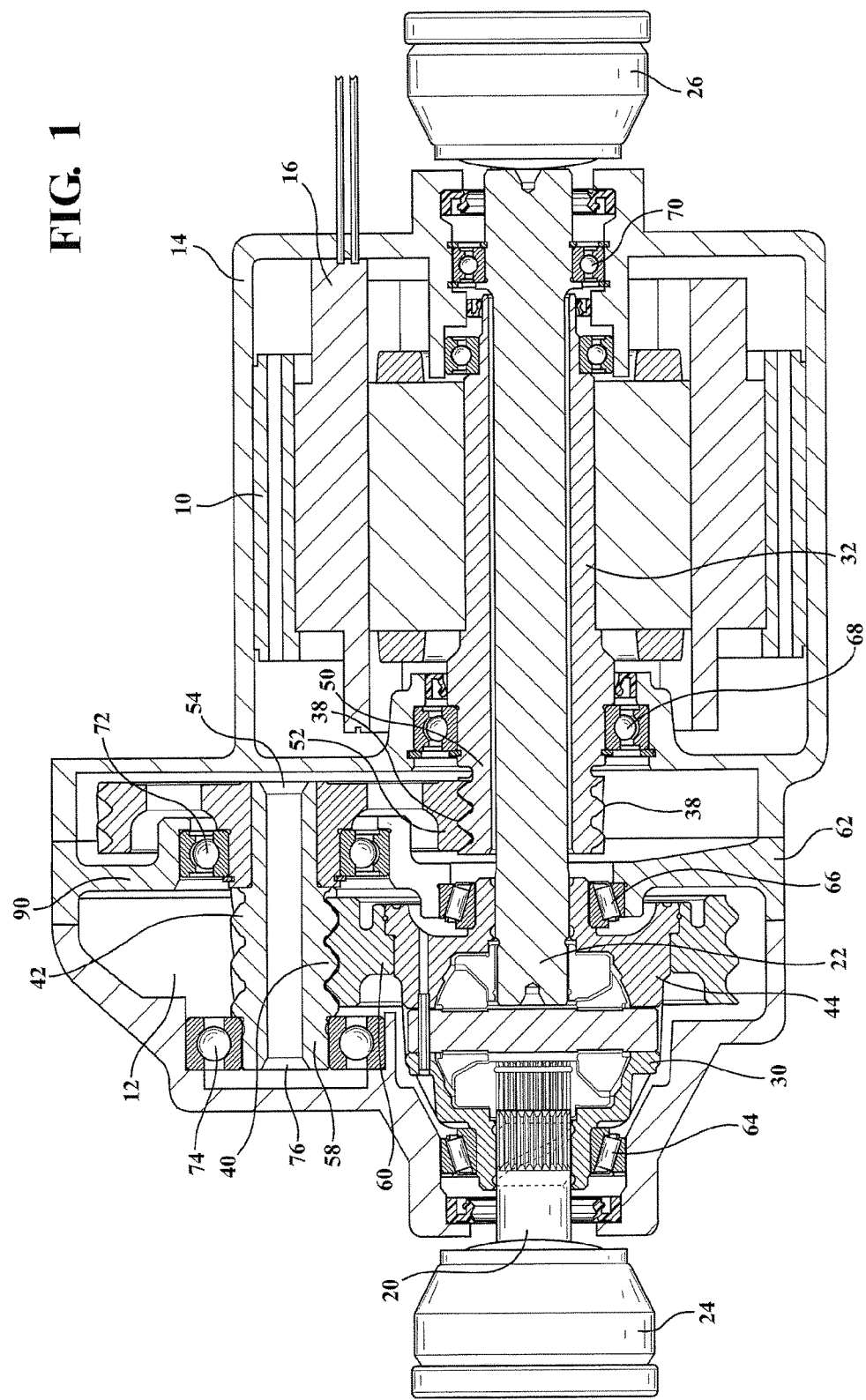
FIG. 1 illustrates cross section view of a drive unit for an electric axle of a vehicle according to an embodiment of the present disclosure.

FIG. 1 is a cross-sectional illustration of a drive unit 10 and a reduction gear assembly 12 according to one embodiment of the present disclosure. The drive unit 10 has a housing 14. The housing 14 may be composed of an assembly of housing segments. The housing 14 contains an electric motor 16 and the reduction gear assembly 12. Although FIG. 1 illustrates the reduction gear assembly 12 situated to the left of the motor 16, it will be appreciated that the reduction gear assembly 12 may be located to the right of the motor 16, depending on the frame of reference. Thus, directional references employed in the present description or claims, such as left, right, top, bottom, upper, lower, and the like, are employed for ease of description and are not intended to limit the scope of the invention in any respect.

Left and right output shafts 20, 22 extend from the housing 14 and support left and right hubs 24, 26 for connecting with and transferring torque to respective left and right wheel assemblies (not shown). The left and right output shafts 20, 22 are connected to the reduction gear assembly 12 and to the motor 16 through an assembly such as a differential unit 30. As shown, the right output shaft 22 is coaxial with and rotatably supported within a main shaft 32 of the drive unit 10. The main shaft 32 may also be referred to as and may be equivalent to a motor or drive shaft of the drive unit 10.

The reduction gear assembly 12 operates to reduce the rotational speed and increase the torque provided by the motor 16 to the differential unit. The reduction gear assembly 12 includes a first stage gear assembly 38 and a second stage gear assembly 40 arranged about an intermediate shaft 42. Specifically, the first stage gear assembly 38 includes a first drive gear 50 and a first driven gear 52. The first driven gear 52 and intermediate shaft 42 form an intermediate shaft assembly. The first drive gear 50 is mounted to and coaxial with the main or motor shaft 32. In one embodiment, the first drive gear 50 is integral to and formed as part of the main or motor shaft 32. The first driven gear 52 is mounted to and coaxial with an intermediate shaft 42 and is rotatably coupled with the first drive gear 50. In some embodiments, the first driven gear 52 is integral to and formed as part of the intermediate shaft 42. As shown, the first driven gear 52 is mounted to a proximal end 54 of the intermediate shaft 42, i.e. the end of the shaft which is axially adjacent the motor 16.

The intermediate shaft 42 is spaced apart radially from and is parallel to the main or motor shaft 32. The first drive gear 50 of the first stage gear assembly 38 is coupled to the motor 16 and the first driven gear 52 of the first stage assembly 38 is coupled to the intermediate shaft 42. The second drive gear 58 of the second stage gear assembly 40 is coupled to the intermediate shaft 42 and the second driven gear 60 of the second stage gear assembly 40 is also coupled with a case 44 of the differential unit 30 for driving the left and right output shafts 20, 22. The gears 50, 52, 58, 60 in the first and second stage gear assemblies 38, 40 may be helical or spur gears.

As described, the second stage gear assembly 40 includes a second drive gear 58 and a second driven gear 60. The second drive gear 58 is mounted to and coaxial with the intermediate shaft 42. In one embodiment, the second drive gear 58 is integral to and formed as part of the intermediate shaft 42. The second drive gear 58 and the first driven gear 52 thus have the same axis of rotation. In one embodiment, the intermediate shaft 42 extends continuously from the first driven gear 52 to the second drive gear 58. The second driven gear 60 is rotatably coupled with the second drive gear 58. The second driven gear 60 is also mounted to and supported by the case 44 of the differential unit 30 in order to transfer torque from the reduction gear assembly 12 to the differential unit 30 and left and right wheels.

As shown in FIG. 1, the differential unit 30 is supported by a housing wall bulkhead 62 which may be a portion of the housing 14 and has the same axis of rotation as the main shaft 32. The differential unit 30 is typically supported by two bearings 64, 66 which may be tapered roller bearings, deep groove ball bearings, angular contact ball bearings, or a combination of deep groove and cylindrical roller bearings. As well, the main or motor shaft 32 is supported by at least two bearings 68, 70 spaced apart axially on opposite sides of the motor 16. The bearings 68, 70 supporting the main or motor shaft 32 similarly to bearings 64, 66, may be ball bearings, tapered roller bearings, deep groove ball bearings, angular contact ball bearings, or a combination of deep groove and cylindrical roller bearings.

Figure 2:
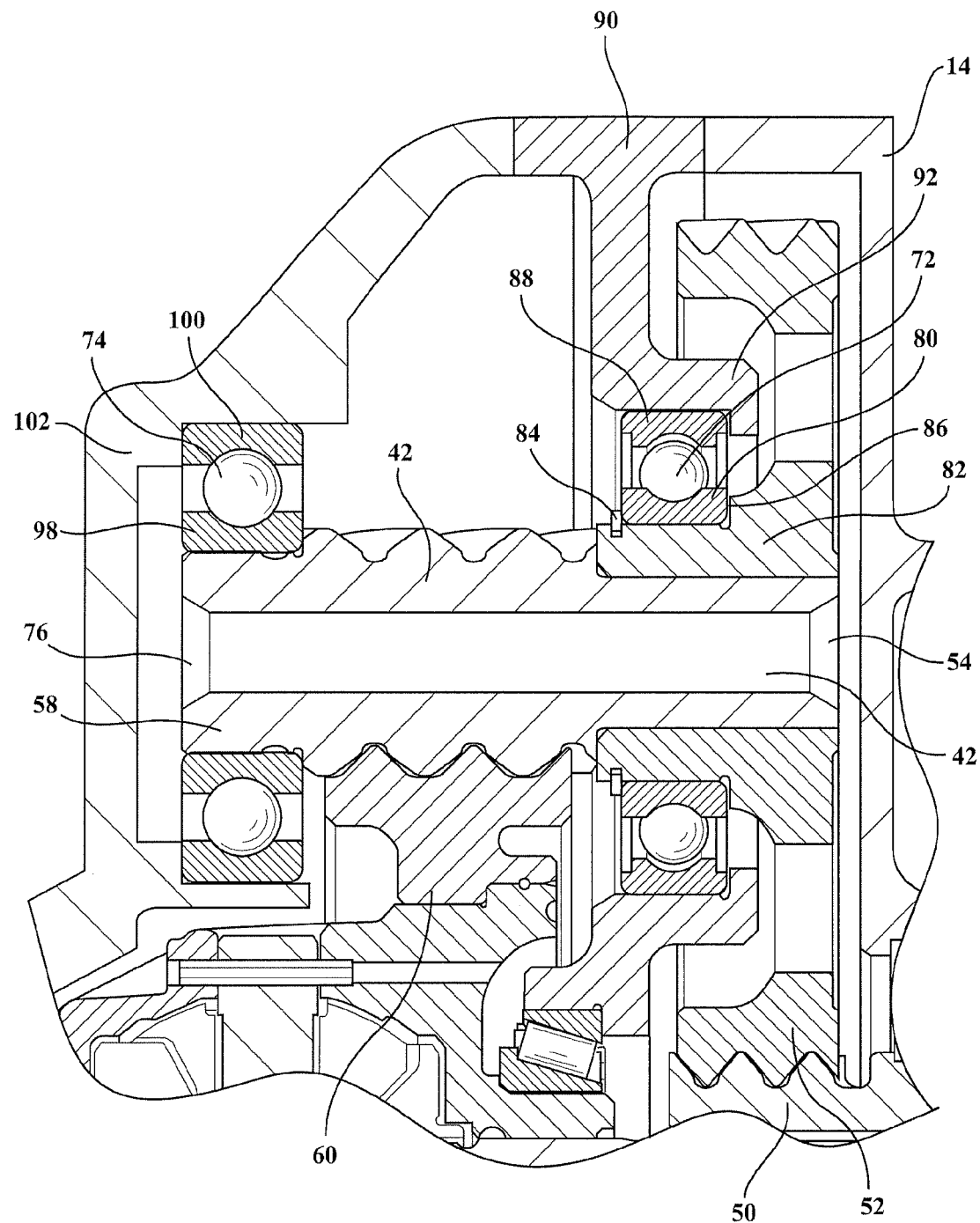
FIG. 2 illustrates a close-up cross section view of a portion of FIG. 1.

A pair of bearings for the intermediate shaft 42 is illustrated in FIG. 1 and in the close-up view of FIG. 2. The pair includes a first bearing 72 and a second bearing 74. The first and second bearings 72, 74 may be deep groove ball bearings, cylindrical roller bearings, angular contact ball bearings, or tapered roller bearings. The first bearing 72 is mounted to the housing 14 and to said first driven gear 52 near the proximal end of the intermediate shaft 42. The second bearing 74 is mounted between the housing 14 and the intermediate shaft 42 at a distal end 76 of the intermediate shaft 42.

Specifically, in one embodiment, an inner ring 80 of the first bearing 72 is mounted to an outer circumferential surface of a shaft portion 82 of the first driven gear 52. The inner ring 80 may be axially fixed with respect to the intermediate shaft 42 between a retaining ring 84 and a first shoulder 86 defined by first driven gear 52. An outer ring 88 of the first bearing 72 is mounted to the housing 14 and specifically, to a portion 90 of the housing 14 which extends inward radially towards the reduction gear assembly 12. In one embodiment, as shown in FIG. 1, this portion 90 of the housing 14 may also form the housing wall bulkhead 62, which supports the differential unit 30. In one embodiment, the outer ring 88 is fixed axially to the right (i.e. in the direction towards the proximal end 54 of the intermediate shaft 42) against a first shoulder 92 defined by the bulkhead portion 90 of housing 14.

The second bearing 74 may be held in a known configuration between the housing 14 and the intermediate shaft 42, as illustrated in FIGS. 1 and 2. In one embodiment, an inner ring 98 of the second bearing 74 is mounted to the intermediate shaft 42 adjacent to the distal end 76. An outer ring 100 of the second bearing 74 is mounted to an inner surface of the housing 14. The outer ring 100 of the second bearing 74 may be fixed axially to the left (i.e. in the direction towards the distal end of the intermediate shaft 42) against a second shoulder 102 defined by the housing 14.

Thus, in one embodiment, each of the first and second bearings 72, 74 may be fixed in one direction relative to the respective proximal and distal ends 54, 76 of the intermediate shaft 42. In other embodiments, the first bearing 72 may be a fixed bearing and the second bearing 74 may be configured with a floating bearing. Alternatively, the second bearing 74 may be fixed and the first bearing 72 may be floating.

In some embodiments, first and second bearings 72, 74 may be of the type and with the configurations shown in table 1 below.

TABLE 1

Configuration of first and second bearings 72, 74 according to embodiments of the present disclosure

| First bearing 72 | Second bearing 74 | Bearing Arrangement |
|---|---|---|
| Deep groove ball bearing - fixed | Deep groove ball bearing - floating | Fixed/floating |
| Deep groove ball bearing - floating | Deep groove ball bearing - fixed | Fixed/floating |
| Deep groove ball bearing - semi fixed | Deep groove ball bearing - semi fixed | Adjusted |
| Angular contact ball bearing | Angular contact ball bearing | Adjusted |
| tapered roller bearings | tapered roller bearings | Adjusted |
| Deep groove ball bearing - fixed | cylindrical roller bearings | Fixed/floating |
| cylindrical roller bearings | Deep groove ball bearing | Fixed/floating |

Figure 3:
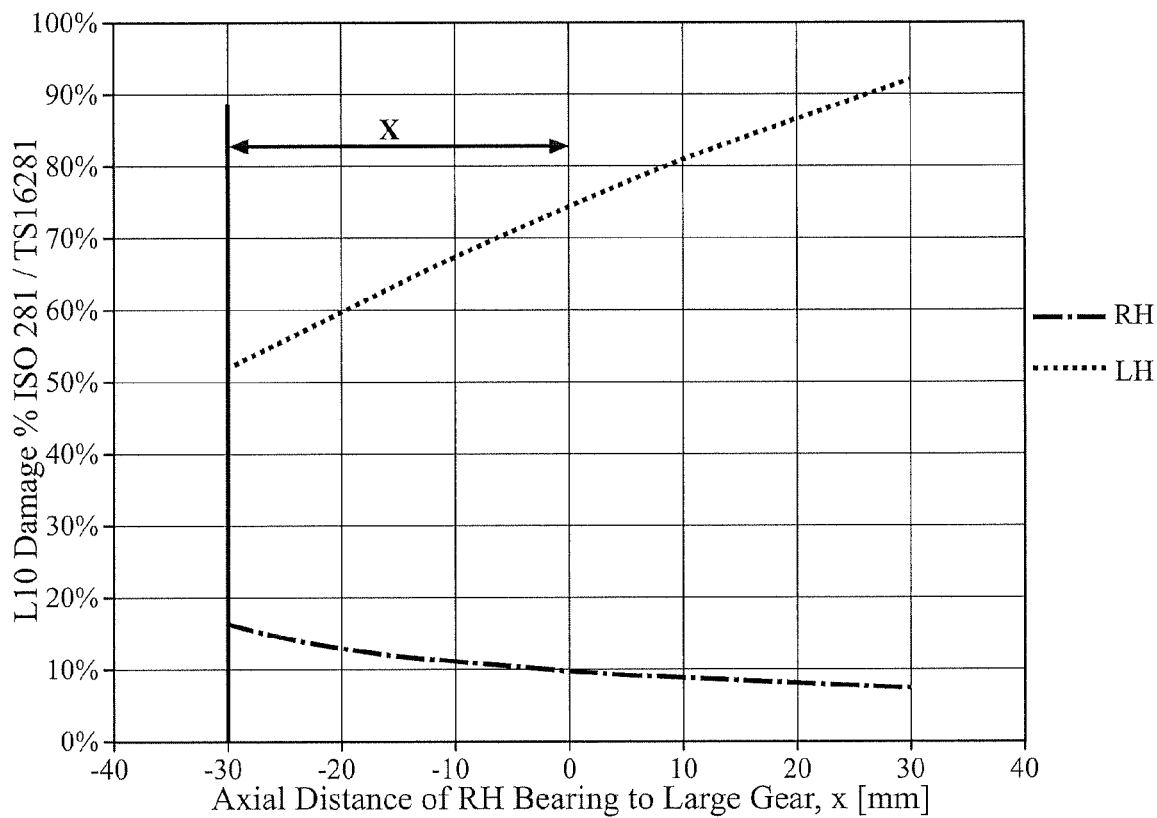
FIG. 3 illustrates a graph of bearing damage versus axial distance of a first bearing to the first driven gear for one embodiment of the present disclosure.
Figure 4:
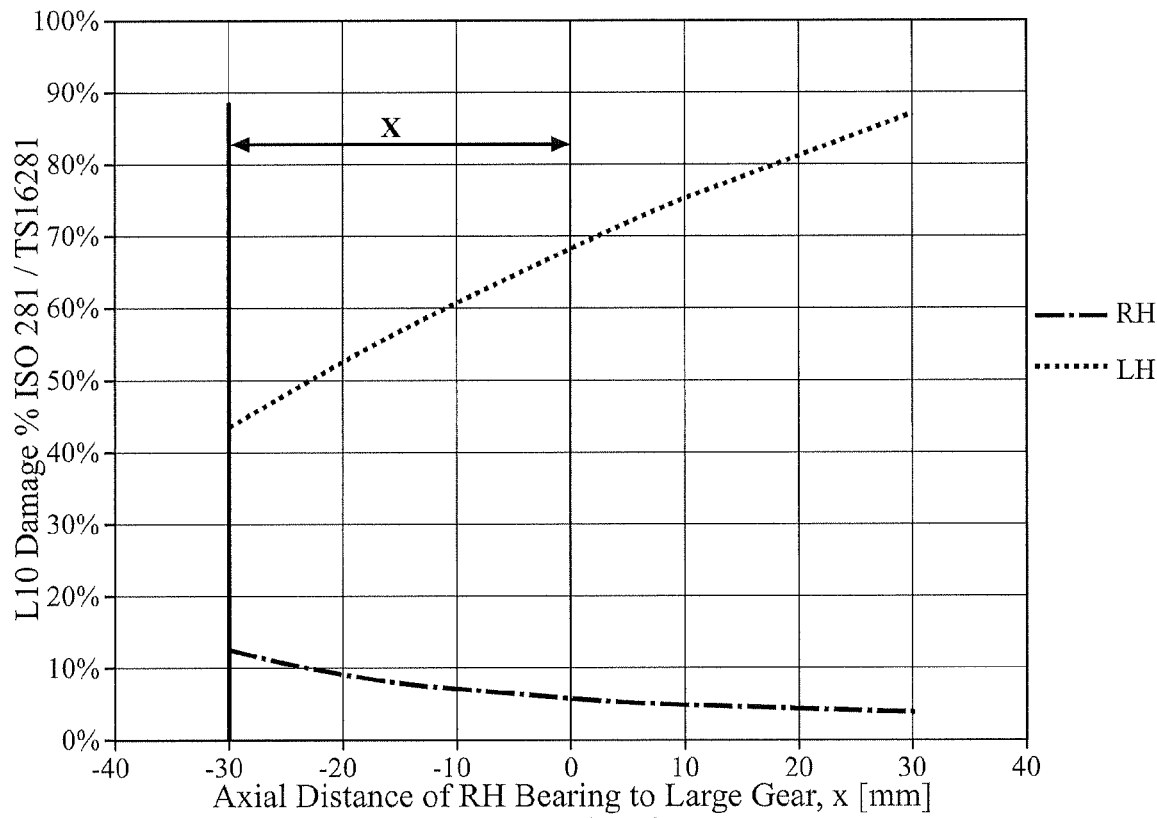
FIG. 4 illustrates a graph of bearing damage versus axial distance of a first bearing to the first driven gear for another embodiment of the present disclosure.

FIGS. 3 and 4 display graphs 300, 400 illustrating the reduction in bearing damage for different axial positions of the first and second bearings 72, 74 relative to the first driven gear 52. The first bearing 72 is noted as the right hand or RH bearing and the second bearing 74 is noted as the left hand or LH bearing. As the distance "x" decreases and becomes negative, i.e. with the first bearing 72 positioned to the left relative to the first driven gear 52, it can be seen that damage in both bearings is reduced. Damage in the LH or second bearing 74 is reduced more significantly than the RH or first bearing 72's damage is increased thus balancing the damage between the first and second bearings 72, 74. FIG. 3 represents the first bearing 72 as fixed and the second bearing 74 as floating. FIG. 4 represents each of the first and second bearings 72, 74 being fixed in one direction relative to the respective proximal and distal ends of the intermediate shaft 42 and preloaded (known as adjusted bearing arrangement).

Certain adaptations and modifications of the described embodiments can be made. Therefore, the above discussed embodiments are considered to be illustrative and not restrictive. Other combinations and configurations of the drive unit components and bearings described herein may be included within the scope of the present disclosure.

What is claimed is:

1. A drive unit for an electric axle of a vehicle, the drive unit having an electric motor for providing drive to a wheel assembly, the drive unit comprising:
    a housing having a bulkhead portion;
    a main shaft driven by the motor;
    a reduction gear assembly coupled to the main shaft, the reduction gear assembly having a first stage gear assembly, an intermediate shaft, and a second stage gear assembly; and
    a pair of bearings;
    said intermediate shaft having a proximal end axially adjacent to the motor and a distal end axially spaced apart and opposite from the proximal end;
    said first stage gear assembly having,
        a first drive gear mounted to and coaxial with the main shaft, and
        a first driven gear rotatably coupled to the first drive gear and mounted to the proximal end of and coaxial with the intermediate shaft,
    said second stage gear assembly having,
        a second drive gear mounted to and coaxial with the intermediate shaft, and
        a second driven gear rotatably coupled with the second drive gear, said first driven gear, second drive gear and intermediate shaft forming an intermediate shaft assembly;
    a first bearing of said pair of bearings is mounted to the bulkhead portion of the housing and to said intermediate shaft assembly between the first driven gear and second drive gear; and
    a second bearing (74) of said pair of bearings (72, 74) is mounted between said housing (14) and said distal end (76) of the intermediate shaft (42).

2. The drive unit according to claim 1 wherein said first driven gear is integral with the intermediate shaft.

3. The drive unit according to claim 2 wherein the first bearing comprises one of a fixed or floating bearing and wherein the second bearing comprises the other of a fixed or floating bearing.

4. The drive unit according to claim 2 wherein the first bearing is configured to support axial loads in a direction towards the proximal end of the intermediate shaft and wherein the second bearing is configured to support axial loads in a direction towards the distal end of the intermediate shaft.

5. The drive unit according to claim 4 wherein the second drive gear is integral with the intermediate shaft.

6. The drive unit according to claim 5 wherein the intermediate shaft extends continuously from the first driven gear to the second drive gear.

7. The drive unit according to claim 6 wherein the pair of bearings are configured to solely support the intermediate shaft assembly within the housing.

8. The drive unit according to claim 7 wherein the intermediate shaft is parallel to and spaced apart radially from the main shaft.

9. The drive unit according to claim 8 wherein the bulkhead portion of the housing is configured to rotatably support one end of a differential unit coupled to the second driven gear for transferring drive to the wheel assembly.

10. The drive unit according to claim 9 wherein the rotational speed of the second driven gear is less than the rotational speed of the first driven gear.

11. The drive unit according to claim 10 wherein the first drive gear is integral with the main shaft.

12. The drive unit according to claim 11 further comprising a spline operably connected to the main shaft and first driven gear for driving said first driven gear.

13. The drive unit according to claim 12 wherein said main shaft is directly operably connected to the motor.

* * * * *